United States Patent [19]

Duffy et al.

[11] Patent Number: 5,372,380
[45] Date of Patent: Dec. 13, 1994

[54] FILTER AND METHOD OF FORMING

[75] Inventors: Andrew J. Duffy, La Crescenta;
Richard B. Kaplan, Beverly Hills;
Stanley A. Racik, Sherman Oaks;
Edwin P. Stankiewicz, Calabasas;
Robert H. Tuffias, Los Angeles;
Brian E. Williams, Simi Valley, all of Calif.

[73] Assignee: Ultramet, Pacoima, Calif.

[21] Appl. No.: 63,707

[22] Filed: May 20, 1993

[51] Int. Cl.⁵ .................................. B60R 21/28
[52] U.S. Cl. .................. 280/740; 55/DIG. 42; 280/742
[58] Field of Search .............. 280/728 R, 736, 740, 280/741, 742

[56] References Cited

U.S. PATENT DOCUMENTS 5,064,459  11/1991  Unterforsthuber et al. ........ 280/736

Primary Examiner—Kenneth R. Rice
Attorney, Agent, or Firm—Beehler & Pavitt

[57] ABSTRACT

An airbag assembly including an inflatable airbag, an ignitable propellant charge for generating inflating gas and a filter between the interior of the airbag and the propellant charge. The filter comprising a porous carbon foam substrate coated substantially throughout with a thermally and structurally stable material which has been formed in situ by chemical vapor deposition techniques.

14 Claims, 3 Drawing Sheets

FILTER AND METHOD OF FORMING

BACKGROUND OF THE INVENTION

1. Field of the Invention

The invention relates in general to porous composite media, and, in particular, to filters which operate under extreme conditions of thermal and pressure shock to perform multiple functions, and to their method of preparation.

2. Description of the Prior Art

Certain filter applications require that hot gases from what is in effect an explosion be reliably filtered to remove particulate material, control the flow of hot gas, and moderate the temperature and pressure of the gas. One such application is that of automobile safety crash bags. Such crash bags (airbags) typically consist of a solid propellant gas generator, a filter, a housing and the bag. At the onset of the crash, a sensor activates an ignitor which "lights off" the solid propellant charge located in the center. Hot, high pressure gas including some entrained particulate material is generated, passed through a filter and into the bag. Total operating time is typically 50-100 milliseconds. The initial instantaneous pressure pulse may be as high as 1500 to 4,000 pounds per square inch, and the initial instantaneous temperature of the gas may be as high as 1,500 to 3,000 degrees Fahrenheit. Large quantities of particulate material with a wide particle size distribution are generated. The filter should in essence accept the gas generated in an explosion and modify it so that it will safely and rapidly inflate but not rupture an airbag. The modification of the explosion's gaseous byproducts should include the removal of particulate matter which might puncture the airbag and significantly contaminate the breathable air in the vehicle, cooling the byproducts so that they will not melt the bag or injure the user, buffering the initial pressure pulse, limiting the flow rate so that the gas will not rip the bag, and distributing the gas uniformly throughout the volume so that it will not overload and rip any part of the bag during inflation. Previous expedients were generally deficient in achieving these objectives.

An excessively hot gas stream may burn the user. Thus, the gas should have a temperature of no greater than approximately 600 degrees Fahrenheit when it contacts and commences to expand the airbag. As the gas enters the collapsed airbag and begins to expand it the inertia of the airbag walls requires that the rate at which the gas flows should be limited. Also, a blast of high pressure gas might injure the user. Thus, the pressure pulse must be damped by the filter to slightly above atmospheric pressure, for example, approximately 15 pounds per square inch. The airbag filter should withstand pressure pulses as high as 3,000 or even 4,000 pounds per square inch and temperature pulses as high as 3,000 or at least 2,732 degrees Fahrenheit. The efficiency of the airbag filter should be such that no more than, for example, approximately 2 grams of particulate material passes through the filter into the airbag. In order to accomplish these ends the filter must permit the hot, high velocity, inflation gases to pass uniformly through the filter media without channelling. To accomplish these objectives the filter should be structurally and thermally stable, that is it should withstand the highest anticipated pressure and thermal pulses without significant degradation. Significant degradation occurs when the filter is physically damaged to the extent that it fails to achieve one or more of its objectives. The filter media should be machinable in a manufacturing process to a tolerance of plus or minus five thousandths of an inch. It should also be capable of withstanding a press fit. Previous expedients were generally deficient in meeting many of these requirements, particularly in being structurally and thermally stable.

The key component is the filter which performs several functions. The filter must have sufficient strength, toughness and temperature resistance to survive the initial instantaneous pressure and thermal pulses, provide a predetermined flow resistance to permit the filling of the airbag without subjecting it to the initial pressure pulse, provide sufficient particulate capture efficiency, provide some thermal capacity so that hot gas is not expelled into the airbag and produce reliable, predictable, uniform flow through the filter. Previously proposed expedients were generally deficient in meeting one or more of these environmental requirements.

Previously proposed airbag filters were typically composed of an inner and outer wire or perforated cage, which provided the required mechanical strength and held the filter media in place. Typically, a ceramic fiber felt was used as the kilter media. Woven metal mesh was also proposed previously. The ceramic fiber felt had essentially no strength and had to be supported in the wire cages. Due to the inherent non-uniformity and limited strength of the previous filters, the gasses often channeled unpredictably through the filter media, resulting in non-uniform, non-repeatable filtration and flow. This channeling, inter alia, permitted hot gas and a large amount of large sized particulate matter to be expelled into the bag. This often resulted in burning the automobile occupant, over or under inflating the airbag, or the physical failure and/or explosion of the device.

Other filter materials have been proposed with similarly poor results. Ceramic filters generally have very poor thermal shock resistance, resulting in cracking and filtration failure. Metal filters generally will not survive the temperature and pressure excursions and still provide the necessary uniform filtering. Further, previously proposed filters generally did not have the pore size, shape, strength and uniformity required to uniformly distribute the gas, optimize the gas flow and trap particles efficiently.

These and other difficulties of the prior art have been overcome according to the present invention.

BRIEF SUMMARY OF THE INVENTION

A preferred embodiment according to the present invention comprises an open celled porous carbon foam or skeleton coated with a thermally and structurally stable material. This porous composite media may be shaped by machining, holds its own shape without extra supporting structure, has very high resistance to thermal and pressure shock, enjoys a high heat capacity, and the permeability and pore volume are generally uniform. The filter provides uniform distribution of the propellant gas without preferential channeling. Filters constructed from this porous composite media, in addition to removing particulate material, serve particularly to control pressure, pressure rise time, temperature, and flow uniformity. This multifunctional filter composite media is strong, tough and enjoys a high heat capacity.

The use of materials which may be machined permits the material to be shaped to the desired form and used for its intended purpose as a filter without the necessity of providing any additional supporting structure. The filter media may, for example, be in the form of a hollow cylinder. The cylinder may be formed after pyrolyzation or after the coating is partially or fully applied. If desired, the unpyrolyzed preform may be provided in the desired net or near net shape of the final product.

Porous composite media according to the present invention is formed according to one preferred embodiment by infiltrating a block of porous polyurethane foam with a carbonizing resin to provide a preform. Pyrolyzing the resin impregnated foam converts the preform to an open cell, porous, carbon foam or skeleton substrate. The resultant rigid skeletal substrate is then coated with a thermally and structurally stable inorganic material to provide the desired composite structure. According to one preferred embodiment chemical vapor deposition techniques are utilized to apply the coating. Alternatively, the coating may, in some instances, be applied by electroplating, electroless plating, liquid precursor infiltration and pyrolysis, or the like. In general chemical vapor deposition techniques are preferred. The term, chemical vapor deposition, as used herein, is intended to include all forms of infiltration and vapor deposition.

The pore size and the nature and amount of substrate and coating present in the composite structure may all be very closely controlled. Thus, through the controlled construction of the composite porous media the volume, rate and pressure of the gas which is allowed to flow through the media may be limited to predetermined levels. Also, the exit temperature of the gas may be limited, all in addition to the removal of particulate material. The ability to tailor the filter media so as to control the pressure and temperature drops across the filter to repeatable predetermined values for a particular application is particularly significant.

The utilization of chemical vapor deposition techniques permits the application of a wide variety of coating materials to the skeletal substrate. Also, the deposition of the coating material may be closely controlled as to thickness and uniformity. The coating may, for example, be of a uniform thickness throughout the media or the deposition process may be controlled so that the coating is thicker or has differing characteristics in some regions. Multiple coats of the same or different materials may applied. Pore sizes may be varied from one region to another. The media may thus be tailored to meet very specific requirements. The coating on the ligaments on the exit side of a filter structure may, for example, be thicker than on the entry side so as to remove heat from the gas after most of the particulate material has been removed and just before it exits the shaped filter. The ligaments in the interior of the body of filter media may receive more or less of the coating material than those in the exterior regions.

The unpyrolyzed resin impregnated preform should contain a sufficient source of carbon to permit the formation of a carbonaceous skeleton of the desired density. In one embodiment polyurethane foam is used to support the resin in place until pyrolysis occurs. The resin is the source of most of the skeletal carbon. The resin may include particulate fillers such as, for example, free carbon, metal or ceramic. The characteristics of the pyrolyzed substrate may thus be tailored to meet the requirements of a particular application. The phrase "pyrolyzed carbon substrate" is intended to include all forms of carbon and graphite substrates as well as such substrates with, for example, metal or ceramic inclusions.

For airbag filters the preferred coating materials have melting points above approximately 1,100 degrees Centigrade and relatively high heat capacities. Such coating materials include, for example, niobium, tantalum, iron, nickel, tungsten and molybdenum.

The substrate serves primarily as a skeleton to define the geometry of the structure. The coating provides most of the structural strength of the filter. The substrate must be sufficiently open so that the coating can be deposited as desired in situ throughout the substrate. In general the substrate has a density of from approximately 0.01 to 0.20 grams per cubic centimeter, and preferably from about 0.03 to 0.08 grams per cubic centimeter. The void volume within the body of the substrate should be controlled so that after the coating is applied the desired pressure drop across the structure is realized. Also, there should be sufficient surface area and tortuosity within the body of the substrate so that it will have the necessary capacity for trapping foreign substances.

In general the structures according to the present invention are most useful as filters. The geometry of the skeleton should provide a tortuous path for gas, liquid, suspension or other particulate bearing fluid that flows through the filter. A preform of reticulated foam has been found to be particularly suitable for use as a preform according to the present invention, although mesh, matte, felt or loosely woven cloth may also be used as the preform under certain circumstances.

The physical form of the substrate at the time of coating is generally such that it does not have a thickness of more than approximately two inches in at least one dimension. Keeping the thickness to less than approximately two inches in at least one dimension permits careful control of the deposition of coatings by known chemical vapor deposition techniques. One convenient physical form for the substrates is that of a tube or hollow cored cylinder having a wall thickness of approximately 0.25 to 2 inches, a diameter of from approximately 1 to 12 inches or more and a length of up to several feet.

The coating which may be refractory metal according to the present invention is comprised of a formed in situ layer or layers of thermally and structurally stable material. The coating is applied throughout the void volume of the carbon foam preform so that the ligaments are coated. The thickness of the coating may be consistent throughout or it may be varied as desired by controlling the deposition parameters. In general the coating material is substantially refractory in nature and it may be metallic or nonmetallic, pure or alloyed, or otherwise admixed, and layered or monolithic. In order to provide sufficient heat capacity and strength the coatings, whether composed of one or several layers, generally have a total thickness of from 0.01 to 5 mils, and preferably from approximately 0.1 to 5 mils.

The coated structure generally has a density of from approximately 0.2 to 5 grams per cubic centimeter, and, preferably, from about 5 to 20 weight percent of theoretical solid. In general, the preferred coated structures have a density of at least approximately 1 gram per cubic centimeter. The finished filter is generally from approximately 60 to 95 percent, and preferably approximately 90 percent, void volume. The void volume should be maximized consistent with thermal and structural stability requirements.

The layer or layers which comprise the coating on the substrate are applied by conventional chemical vapor deposition/chemical vapor infiltration procedures. In a preferred embodiment an open pore foamed carbon skeleton is formed according to conventional procedures for the preparation of such a structure. This skeleton has a thickness of from about 0.25 to 2 inches in at least one dimension, a density of from approximately 0.01 to 0.2 grams per cubic centimeter, and from about 30 to 1000 pores per inch. The reticulated structure is then placed within a pores per inch. The retriculated structure is then placed within a reaction chamber where temperatures, pressures and the surrounding atmosphere may be controlled. The reaction chamber is sealed and purged with, for example, argon gas. The input gases for the desired reactions are typically, for example, chlorides of the desired coating materials, hydrogen, chlorine, methane, argon and the like. Metallic chlorides may be generated in the reaction chamber during the operation of the reactor by flowing chlorine gas through the desired metals which have been heated to the appropriate reaction temperature. The argon is used to initially and finally purge the system, and as a diluent gas to control the deposition rate. Other gasses may be used for this purpose, if desired. The partial gas pressure is typically maintained at from approximately 2 to 500 torr. It is often desirable to maintain the partial gas pressure as low as possible so as to accomplish uniform deposition throughout the interstices of the reticulated substrate. The substrate is placed in the reactor, preferably on a rotating support, and a thermocouple is attached to permit the monitoring of its temperature during the deposition process. The reactor is heated, preferably by induction, to the desired reaction temperature. The substrate which is the target of the deposition is heated typically to from approximately 150 to 2600 degrees Fahrenheit. The rate and nature of the deposit on the substrate are controlled by adjusting the various gas flow rates. According to conventional procedures, the conditions are adjusted so that there is little or no nucleation in the gas phase, that is, the formation of powders in the gas stream is avoided. A substantially uniform crack free coating is formed throughout the open pored structure and encapsulates each element of the skeleton.

Where the structure of the filter member is formed by other than chemical vapor deposition procedures one conventional procedure which may be used is that of bath platings. In bath plating the substrate carbon foam is immersed in a liquid admixture of the desired coating material. The liquid admixture is heated, preferably to from approximately 100–250 degrees Fahrenheit, and is agitated to promote uniform deposition throughout the interstices of the reticulated substrate. The substrate is then subjected to catalytic or autocatalytic treatment to form the desired thermally and structurally stable coating. Other conventional procedures may be used for applying the coating, if desired. Chemical vapor deposition and infiltration procedures are preferred.

BRIEF DESCRIPTION OF THE DRAWINGS

Referring particularly to the drawings for the purposes of illustration and not limitation.

DETAILED DESCRIPTION OF THE PREFERRED EMBODIMENTS

Figure 1:
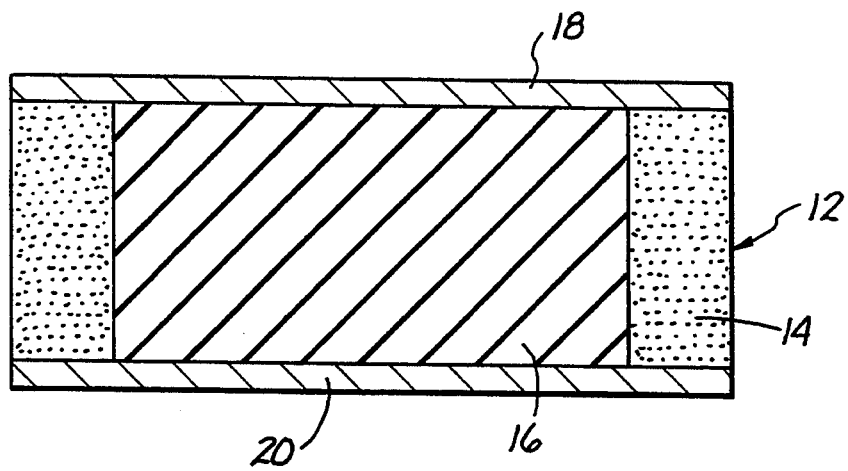
FIG. 1 is a schematic cross-sectional elevation of a preferred embodiment of the invention wherein a propellant charge is located within an annular filter element.
Figure 3:
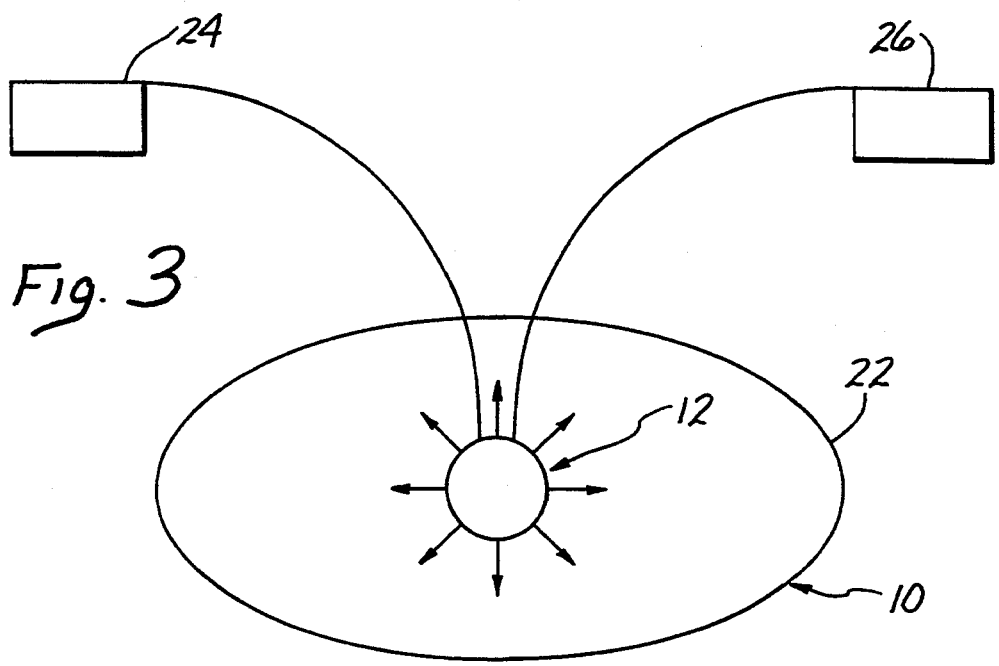
FIG. 3 is a diagrammatic view of an airbag installation which incorporates a filter according to the present invention.

Referring particularly to the drawings, there is illustrated generally at 10 an airbag assembly, FIG. 3, including a cannister or containment vessel indicated diagrammatically at 12, in which a filter element 14, FIG. 1, and a solid gas generating charge or propellant gas generator 16 are closed by gas impervious end caps 18 and 20. Filter element 14 is in the form of a cylinder or annular ring. The charge 16 is positioned within the closed cavity formed by the inner wall of filter element 14 and the end caps 18 and 20. Cannister 12 is positioned within or in direct communication with the interior of airbag 22. Sensors 24 and 26 serve to detect an impact of sufficient magnitude to require the activation of the airbag assembly. When an impact is sensed the sensors transmit a signal which ignites the charge 16 through a suitable ignitor, not illustrated. When charge 16 is ignited the resulting hot gas is expelled radially through filter 14 into airbag 22. The thermal and pressure surges are moderated and particulate materials are removed from the gas by the filter before the gas reaches the airbag. The filter element is essentially a high strength metallic filter with very closely controlled uniform characteristics and sufficient hoop strength to withstand the pressure pulse.

Figure 2:
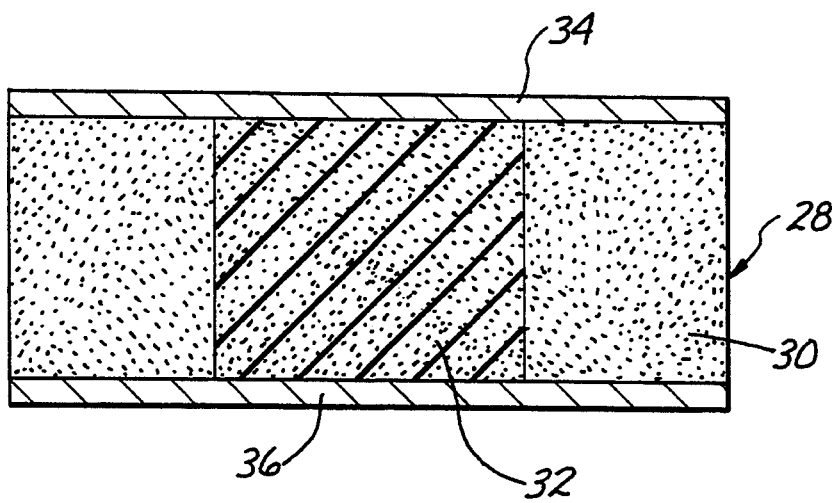
FIG. 2 is a schematic cross-sectional elevation of a further embodiment of the invention wherein the mid-region of a filter disk is impregnated with propellant charge.

In the embodiment illustrated, for example, in FIG. 2 a cannister indicated generally at 28 includes a disk of filter media 30 which is impregnated in its axial region with an ignitable gas generating charge 32. The charge 32 is dispersed throughout the interstices in the axial region of media 30. The axial ends of the disk 30 are closed with gas impervious end plates 34 and 36.

Figure 4:
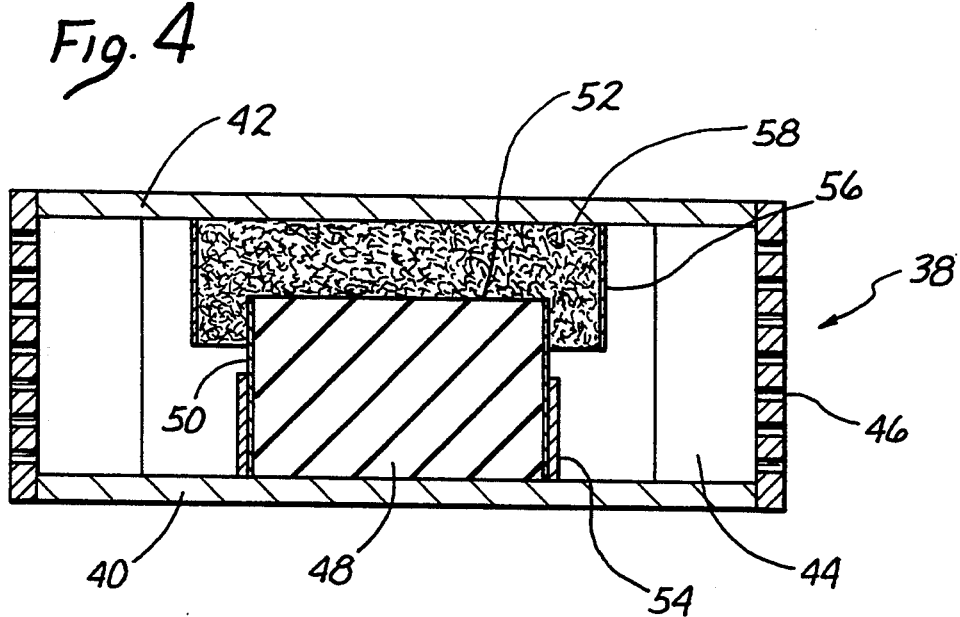
FIG. 4 is a schematic cross-sectional elevation of a further embodiment of the invention utilizing a conventional propellant canister including a prefilter.

In the embodiment illustrated, for example, in FIG. 4, a conventional annular charge cannister indicated generally at 38 is closed by impervious end caps 40 and 42. An annular filter member 44 is confined on the outer diameter by a perforated cylindrical wall 46. Perforate wall member 46 provides radial support for the outer diameter of filter 44 while allowing the inflator gas to pass through. Any suitable method of forming perforation may be used, including, for example, slitting, mesh forming, punching, or the like. A charge 48 is located in a light walled container 50. The upper wall 52 of container 50 is lighter than the side walls so it ruptures preferentially under the force of the gas charge. The container 50 is located within a holder 54 which holds it in place. A body of pre-filter material 58 is provided adjacent upper wall 52 to absorb heat, receive the initial force of the inflator gas and provide initial filtration of the combustion products. The gas is initially directed upwardly by the preferential failure of wall 52. The gas is then deflected by end cap 42 toward baffle 56, and by baffle 56 into the cavity between holder 54 and the inner diameter of filter element 44. The gas then flows through filter 44 and perforated wall 46 into an airbag. The prefilter 58 serves, for example, to moderate the temperature and particulate content of the gas. Prefilter 58 may conveniently be composed of, for example, metallic wool or ceramic and is not intended to have the structural strength to withstand unaided the initial blast of propellant gas nor the capability to reduce the particulate content of the gas to the required very low levels. Where it is desired to use an existing charge cannister design, as in a retrofit operation, this is a preferred configuration. Prefilters and baffles may be used in other configurations if desired to alter the temperature, particulate content, pressure and flow characteristics of the inflator gas before it reaches the filter member.

Figure 5:
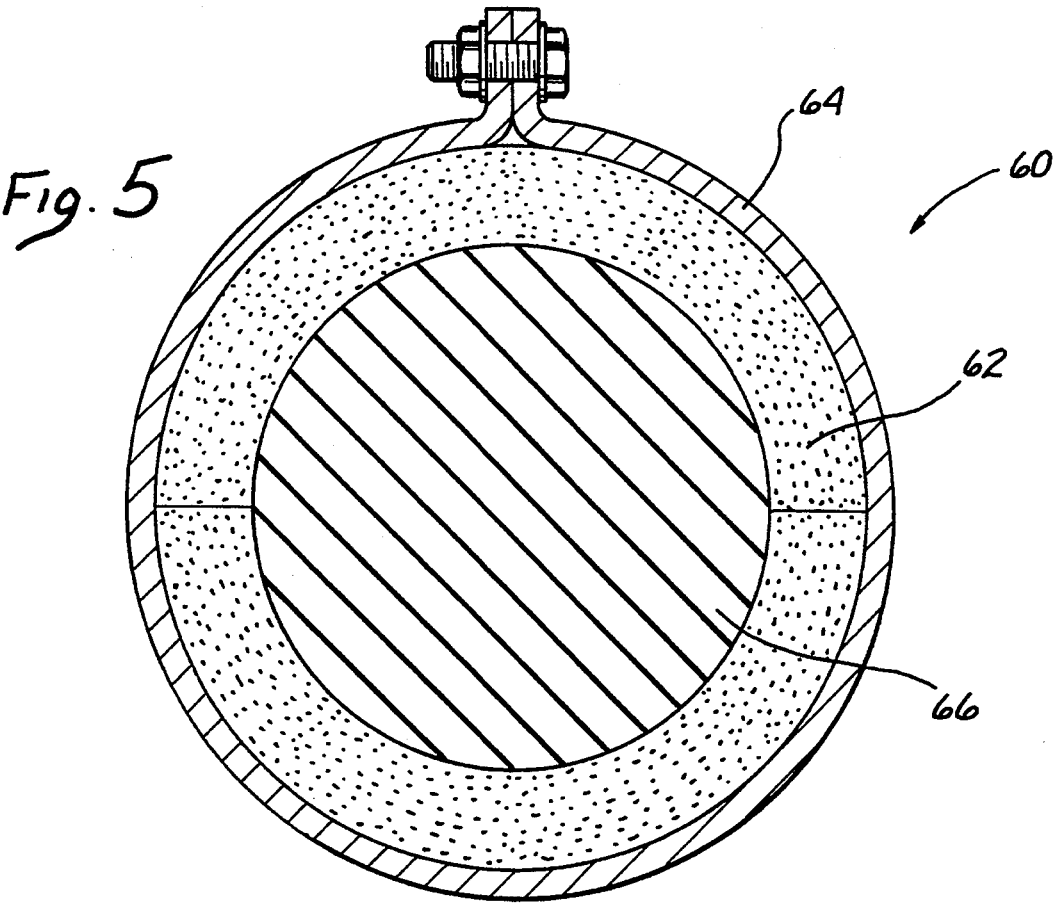
FIG. 5 is a schematic cross-sectional elevation of a further embodiment of the invention wherein a spherical filter element is utilized.

Referring particularly to FIG. 5, there is illustrated generally at 60, a spherical filter of the present invention wherein a filter member 62 is formed in two hemispheres which are held together, for example, by clamping band 64 with a gas generating charge 66 confined within the cavity in the approximate center of the sphere.

Figure 6:
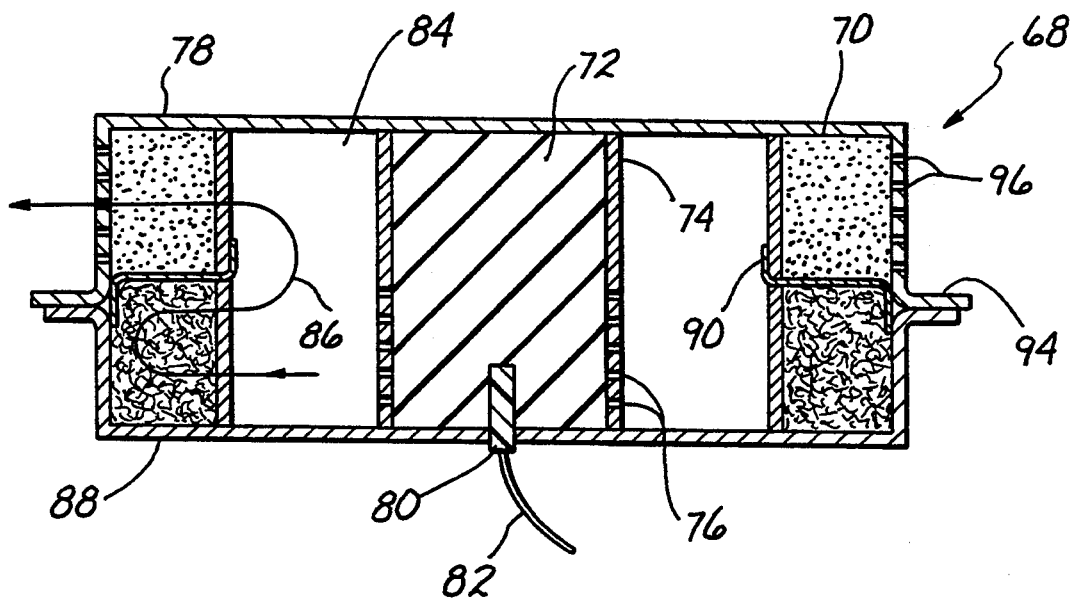
FIG. 6 is a schematic cross-sectional elevation of a further embodiment of the invention wherein a conventional airbag inflator assembly is provided with an annular filter according to the present invention.
Figure 7:
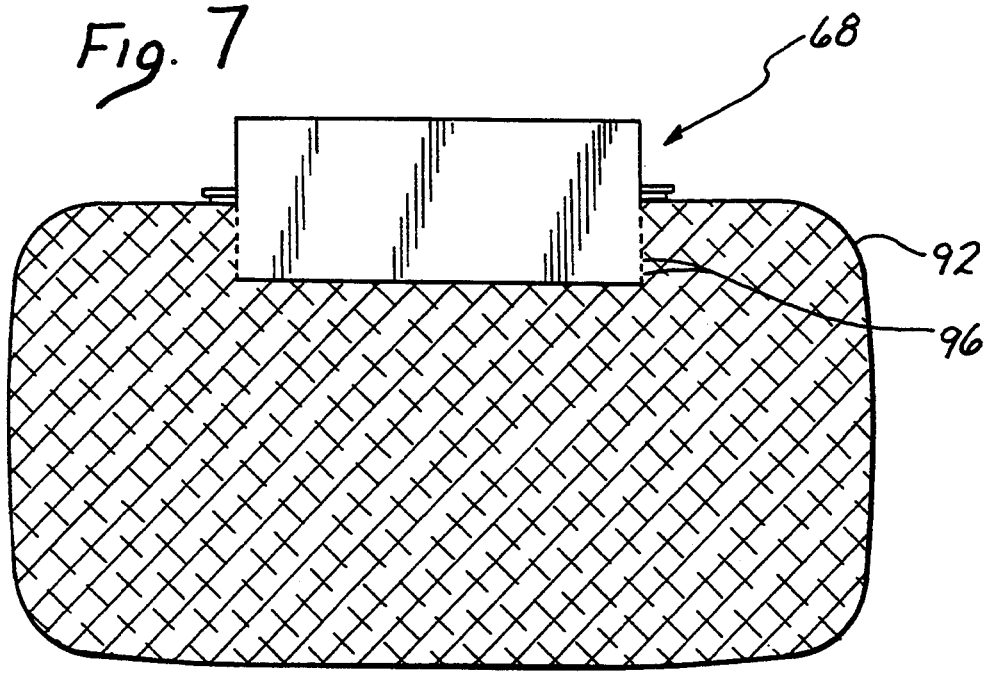
FIG. 7 is a diagrammatic representation of an airbag inflator assembly wherein the housing is mounted in the throat of an airbag.

Referring particularly to FIG. 6 there is illustrated generally at 68 a conventional airbag inflator assembly which incorporates a filter member 70 which is constructed according to the present invention. A propellant charge 72 is centrally located within housing 78 inside of a cannister 74. Cannister 74 is provided with a plurality of ports or perforations 76 in the normally lower portion of the annular peripheral wall which surrounds charge 72. Alternatively, the walls may be selectively weakened so that the gas forms its own ports. An igniter 80 is positioned so that an electrical impulse received via wire 82 will cause the ignition of propellant charge 72. The products from the ignition of the charge 72 are discharged from cannister 74 through ruptured ports 76 into an annular space 84 where they generally follow the path indicated at 86. The ignition products flow from annular space 84 into a prefilter 88. Prefilter 88 is generally constructed from woven metal which serves to cool the ignition products, absorb part of the initial pressure pulse, and remove part of the entrained particulate matter. From prefilter 88 the ignition products flow around baffle 90 into annular space 84 and into filter 70. From filter 70 the inflator gas flows through ports in the wall of the housing 78 and into an airbag. A conventional airbag installation is illustrated, for example, in FIG. 7 where the throat of airbag 92 is mounted to flange 94 of housing 78 with ports 96 inside of airbag 92. The uniformity of gas flow which is provided by the present invention avoids, inter alia, the risk of catastrophic failure by reason of the airbag being separated from the housing by the uneven application of the force of the inflator gas.

In a preferred embodiment for the fabrication of metallic foam airbag filters a commercially available reticulated polyurethane foam is liquid infiltrated with a carbon-bearing resin and pyrolyzed at approximately 600 to 1200 degrees centigrade such that an all-carbon reticulated foam structure or billet is formed. The resulting pyrolyzed carbon ligaments define the tortuous paths which are distributed substantially uniformly throughout the billet to provide substantially uniform pores. This substantial uniformity contributes to the uniform dispensing of propellant gas from the filter member. Also, the characteristics of the gas are substantially uniform throughout its volume when it exits the filter member. The controlled variance in density of this material is between 0.01 and 0.20 grams per cubic centimeter. The pore size for a particular filter is generally closely controlled to an approximately uniform size with a variation of no more than approximately 10 to 20 percent. The average pore sizes may be controlled during fabrication to values ranging from approximately 30 to 1000 pores per lineal inch (ppi), preferably approximately a nominal 100 pores per inch. The pyrolyzed carbon foam billet is machined to the desired configuration using ordinary machine tools. In general it is possible to hold tolerances to plus or minus five thousandths of an inch in such machining operations. A preferred machined configuration is that of a hollow tube or cylinder having a wall thickness of approximately three-eighths of an inch and having approximately 100–500 pores per inch.

The entire machined foam tube ligament structure is provided with a uniform coating of niobium by known chemical vapor infiltration (CVI) techniques. In this process, the machined foam tube substrate is heated to from about 900 to 1300, and preferably approximately 1200, degrees centigrade, in an inert atmosphere in a closed reactor. A mixture of hot niobium chloride and hydrogen gases are passed through the heated foam tube substrate. The metal chloride is reduced by the hydrogen to form hydrogen chloride gas, which is discharged from the reactor, and a niobium metal coating is deposited throughout the carbon foam substrate. The deposition process is continued until the material reaches a density of approximately 1–1.5 grams per cubic centimeter. Repetition of this process utilizing chlorides of iron, nickel, tantalum, molybdenum, tungsten and mixtures thereof or the like in place of or in addition to niobium chloride produces good deposits of the respective metals and their alloys. If desired, deposits of oxides such as silicon dioxide, may be utilized alone or combination with other materials. If desired catalytic material may be incorporated in or comprise the coating to provide an additional reduction in particulate material by chemical reaction. Likewise, deposits of carbides such as hafnium and tungsten carbide may also be utilized as the material which coats the interstices of the porous filter member.

Using conventional machine tools, the coated foamed tubes are sliced radially into rings of the desired height ready for assembly into airbag inflator assemblies. A conventional propellant charge is used and the open ends of the ring filter material are sealed with steel plates which may be sealed with gasket material, if desired. In a preferred embodiment the inflator assembly is located with at least the inflator discharge ports within the airbag so that gas emitted through the filter is directly within the airbag. Conventional charge cannisters are generally mounted in a fixed position as a part of an airbag inflator containment vessel. In the retrofitting of such conventional cannisters they are generally left in the fixed configuration within the vessel. Upon ignition the filter retains its structural integrity and the emitted gas fills the airbag without rupturing it. Only a very few fine particles pass through the filter and there is no indication that the airbag has been subjected to excessive temperatures or loads or that there has been any preferential channeling of the gasses through the filter. The indications are that the propellant gasses are uniformly dispersed radially through the tortuous paths in the filter.

What has been described are preferred embodiments in which modifications and changes may be made without departing from the spirit and scope of the accompanying claims.

What is claimed is:

1. An air bag assembly comprising a propellant gas generator, an igniter for said propellant gas generator, an airbag, and a filter member between said propellant gas generator and said airbag, said filter member comprising a rigid porous composite having a pyrolyzed carbon substrate and a thermally and structurally stable coating, said filter member having the unaided structural strength and toughness to withstand an instantaneous pressure pulse of at least approximately 4,000 pounds per square inch and an instantaneous temperature pulse of at least approximately 2,700 degrees Fahrenheit, whereby propellant gas is dispensed substantially uniformly from said filter member.

2. An airbag assembly of claim 1 including a containment vessel for said propellant charge.

3. An airbag assembly of claim 1 including a containment vessel for said propellant gas generator, said containment vessel having walls substantially surrounding said propellant gas generator, said filter member defining at least part of said walls.

4. An airbag assembly of claim 3 wherein said filter member is adapted to withstand initial pressure pulses of at least approximately 2,000 pounds per square inch and initial temperature pulses of at least approximately 2,000 degrees Fahrenheit.

5. An airbag assembly of claim 1 wherein said propellant gas generator is contained within porous interstices in said filter member.

6. An airbag assembly of claim 1 including a containment vessel for said propellant gas generator and a housing enclosing said containment vessel, said housing being positioned at least partially within said airbag.

7. An airbag assembly of claim 1 including a containment vessel for said propellant gas generator and a housing enclosing said containment vessel, a prefilter positioned generally between said filter member and said propellant gas generator, said filter member being positioned within said housing.

8. An airbag assembly of claim 1 wherein said filter member is generally spherical and said propellant gas generator is located within and generally centrally of said filter.

9. An airbag assembly of claim 1 including a prefilter between the propellant gas generator and the filter member.

10. An airbag assembly of claim 1 wherein baffles between the filter member and the propellant gas generator are adapted to direct the flow of gas.

11. An airbag assembly comprising an airbag, a propellant charge, an igniter for said charge, a containment vessel for said charge located within said airbag, the walls of said containment vessel comprising a generally uniformly porous annular member comprising carbon foam coated with structurally and thermally stable material, said propellant charge being confined axially within said annular member.

12. An airbag assembly of claim 11 wherein said propellant charge is confined within an axially formed opening within said annular member.

13. An airbag assembly of claim 11 wherein said propellant charge is confined within axially positioned pores within said annular member.

14. A process for forming an airbag assembly comprising forming a porous rigid foam substrate having generally uniform tortuous paths extending therethrough, applying a thermally and structurally stable coating substantially throughout said substrate utilizing chemical vapor deposition techniques to form a filter member, providing an ignitable propellant gas generating charge, providing an airbag element adapted to be inflated by propellant gas emitted from said gas generating charge, and positioning said filter member between said gas generating charge and the interior of said airbag element, whereby said propellant gas passes through said tortuous paths before entering the interior of said airbag.

* * * * *